United States Patent
Dorfman et al.

(10) Patent No.: US 9,824,136 B2
(45) Date of Patent: Nov. 21, 2017

(54) DYNAMIC APPLICATION CONTAINERS

(71) Applicant: Microsoft Technology Licensing, LLC, Redmond, WA (US)

(72) Inventors: Jeremy Christopher Dorfman, Waltham, MA (US); Jeremy Edward Dunker, Boston, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 302 days.

(21) Appl. No.: 14/490,900

(22) Filed: Sep. 19, 2014

(65) Prior Publication Data
US 2016/0085841 A1 Mar. 24, 2016

(51) Int. Cl.
G06F 17/30 (2006.01)
G06F 9/46 (2006.01)

(52) U.S. Cl.
CPC ........ *G06F 17/30598* (2013.01); *G06F 9/468* (2013.01)

(58) Field of Classification Search
CPC ............................ G06F 17/30598; G06F 9/468
USPC .......................................................... 707/738
See application file for complete search history.

(56) References Cited

U.S. PATENT DOCUMENTS

| | | | | |
|---|---|---|---|---|
| 9,213,830 B2 * | 12/2015 | Achutha | ........... | G06F 17/30598 |
| 2007/0233979 A1 * | 10/2007 | Beardsley | ........... | G06F 11/2069 |
| | | | | 711/162 |
| 2008/0046724 A1 | 2/2008 | Dailey | | |
| 2009/0222880 A1 * | 9/2009 | Mayer | ................. | G06F 21/6218 |
| | | | | 726/1 |
| 2010/0217853 A1 * | 8/2010 | Alexander | .............. | H04L 63/20 |
| | | | | 709/223 |
| 2011/0010699 A1 * | 1/2011 | Cooper | ................... | G06F 21/12 |
| | | | | 717/169 |
| 2011/0161988 A1 | 6/2011 | Kashyap | | |
| 2011/0252181 A1 * | 10/2011 | Ouye | ................ | G06F 17/30519 |
| | | | | 711/101 |
| 2012/0042079 A1 * | 2/2012 | Ackerman | ........... | G06F 9/4843 |
| | | | | 709/226 |
| 2014/0006347 A1 | 1/2014 | Qureshi et al. | | |

(Continued)

FOREIGN PATENT DOCUMENTS

EP 1515229 A2 3/2005

OTHER PUBLICATIONS

"International Search Report & Written Opinion Issued in PCT Application No. PCT/US2015/050545", dated Nov. 24, 2015, 13 Pages.

(Continued)

*Primary Examiner* — Kris Mackes
*Assistant Examiner* — Tiffany Bui
(74) *Attorney, Agent, or Firm* — Workman Nydegger

(57) ABSTRACT

Managing application interaction on a device using dynamic containers. A method includes, for a set of applications on a device, based on certain conditions, determining a plurality of container groups. Each container group defines a set of applications and a set of interactions parameters defining boundaries of interactions between the applications for the applications in the container group. The method further includes identifying one or more changes in the certain conditions. As a result of identifying one or more changes in the certain conditions, the method includes changing membership in the container groups.

23 Claims, 2 Drawing Sheets

(56) References Cited

U.S. PATENT DOCUMENTS

| | | | |
|---|---|---|---|
| 2014/0007215 A1 | 1/2014 | Romano et al. | |
| 2014/0053234 A1 | 2/2014 | Barton et al. | |
| 2014/0109174 A1* | 4/2014 | Barton | H04W 12/08 726/1 |
| 2014/0181974 A1* | 6/2014 | Yablokov | G06F 21/566 726/23 |
| 2015/0309849 A1* | 10/2015 | Lau | G06F 9/54 715/835 |
| 2015/0358434 A1* | 12/2015 | Parthasarathy | H04L 69/22 370/392 |
| 2016/0057213 A1* | 2/2016 | Greenbaum | H04L 63/10 709/217 |
| 2016/0139737 A1* | 5/2016 | Conn | G06F 3/0481 715/802 |
| 2016/0212012 A1* | 7/2016 | Young | G06F 17/30 |

OTHER PUBLICATIONS

"AirWatch Workspace Management", Published on: Jul. 2, 2013 Available at: http://www.air-watch.com/solutions/containerization.
"Device Protection with KNOX Workspace", Published on: Jul. 5, 2014 Available at https://www.samsungknox.com/en/solutions/knox/technical.
Souppaya, et al., "Guidelines for Managing the Security of Mobile Devices in the Enterprise", in Proceedings of NIST Special Publication 800-124, Jun. 21, 2013, 30 pages.
Chanliau, Marc, "Extending Enterprise Access and Governance with Oracle Mobile Security", in Oracle White Paper, Mar. 2014, 29 pages.
"Mobile Application Management with XenMobile and the Worx App SDK", Published on: Oct. 12, 2013 Available at: http://www.citrix.com/content/dam/citrix/en_us/documents/products-solutions/mobile-containers-with-citrix-mdx.pdf.

* cited by examiner

DYNAMIC APPLICATION CONTAINERS

BACKGROUND

Background and Relevant Art

Handheld mobile computing devices have become ubiquitous. For example, many people have so-called smart phones or tablet computers. Such devices allow users to use cellular data systems or other network systems to access a broad spectrum of services. For example, using such devices, a user can access email, the Internet, on-line databases, etc. People who have personal smart phones (or other smart devices) may often want to use these personal devices to access company resources belonging to the companies by which they are employed.

Identifying and dealing with different classifications of data (e.g. personal versus corporate) on mobile devices can be difficult, particularly when the device is used in different user settings (e.g. business vs. personal use).

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a computing environment. The method includes acts for managing application interaction on a device using dynamic containers. The method includes, for a set of applications on a device, based on certain conditions, determining a plurality of container groups. Each container group defines a set of applications and a set of interactions parameters defining boundaries of interactions between the applications for the applications in the container group. The method further includes identifying one or more changes in the certain conditions. As a result of identifying one or more changes in the certain conditions, the method includes changing membership in the container groups.

Another embodiment includes a device configured to manage application interaction. The device includes a plurality of applications. The device further includes a plurality of application containers. A given application container groups applications together and enforces boundaries of interaction between the applications in the given container. The device is configured to change a set of applications in a container based on changes in conditions.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered limiting in scope, embodiments will be described and explained with additional specificity and detail through the use of the accompanying drawings in which.

DETAILED DESCRIPTION

A containerization solution can be used to isolate different classifications of data from one another. Containerization is the process of segregating data on a device such that data that meets a certain set of qualifiers ends up in a particular set of containers. The goal of containerization is to apply a certain set of traits to a particular container, e.g. encryption or access restriction. In some embodiments, a container can enforce boundaries of interaction between applications in the container. Some embodiments herein implement a set of mechanisms for dynamically building one or more containers for applications based on one or more attributes. For example, attributes may include one or more of: sources of applications, policy constraints, factors related to installation of an application, network connections, geo fencing considerations, time fencing considerations, etc. The ability to dynamically produce containers gives greater flexibility in determining how information is shared amongst applications.

Figure 1:
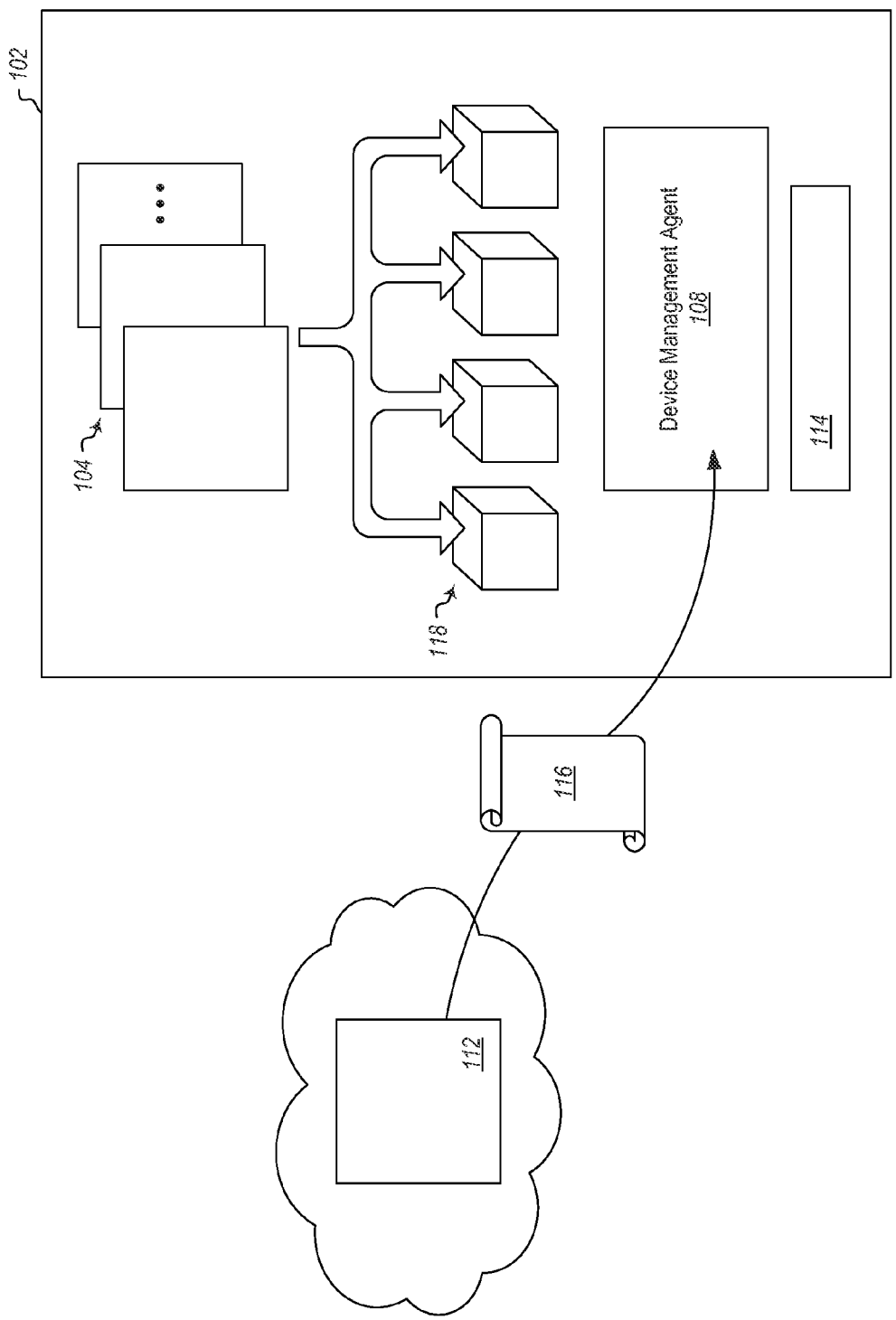
FIG. 1 illustrates a device having applications dynamically organized into containers.

Referring now to FIG. 1, an example embodiment is illustrated. FIG. 1 illustrates a device 102. The device may be, for example, a mobile device such as a phone, tablet or other mobile device. However, the device 102 may be a specimen selected, from classes of other less mobile or immobile computing devices. The device 104 has installed thereon a set of applications 104.

Embodiments can leverage multiple pieces of information to determine the containers in which an application can participate. FIG. 1 illustrates a set of such containers 118. In the example illustrated in FIG. 1, a device management agent 108, a centralized piece of software running on the device, is leveraged to retrieve application specific policy 116 from a service 112 and to enforce the application specific policy 116 to cause applications to be included in or excluded from certain containers. In some embodiments, the device management agent 108 may be implemented using Company Portal available from Microsoft Corporation of Redmond Wash.

The device management agent may also monitor software installation on the device 102. In some embodiments, access to a given container is gated by the device management agent 108 on policy, however, the policy is targeted at specific applications that may originate from the management service 112, (such as an Intune service available from Microsoft Corporation of Redmond, Wash.) or the platform provided store (such as iTunes for iOS platform devices, Play Store for Android devices, Windows Store for Windows devices, etc.) When an application that is restriction enabled starts, it contacts the management service 112 (such as in the example illustrated through the device management agent 108) to retrieve its policy and container specific configuration. This call to the management service 112 also enables applications that were on the device 102 prior to a given container enablement to participate in a new container.

Embodiments can also monitor the installation of new applications on the device 102 to determine if they should be granted access to a container. This allows applications that are added to the device 102 after an original container is defined to participate in the container if policy allows.

Various additions or alternative may be implemented in various embodiments. For example, some embodiments may implement policy independent identification of applications for containers. For example, a container may be determined based on the publisher of an application, the application type, or other application characteristics.

In some embodiments, a single application may be able to participate in multiple containers simultaneously.

In some embodiments, alternate sources of information for container accessibility may be implemented. For example embodiments may be able to restrict access to containers based on device location. This may be determined by GPS, cellular location, Wi-Fi location services, etc. Embodiments may be able to restrict access based on network connection considerations. For example, contain accessibility may be restricted for certain application where restrictions require a known network, connection to a VPN, certain network encryption, etc.

In some embodiments multiple sources of information may be used to identify applications that can access a container.

Some embodiments may identify applications that should be included or excluded from a container based on defined policy.

As noted previously, some embodiments, can allow applications which were on a device prior to a container solution being implemented to participate in the containers.

Embodiments may identify applications which should be included\excluded from the container based on installation source. Thus, for example, some applications may be excluded from certain containers if they are installed, from the platform application repository where applications installed from a management service through a device management agent may be allowed for those same containers.

Embodiments may be able to remove previously included applications from a container when criteria change. As noted, this may be enabled by checks made by applications when they start to contact a management service to obtain policy and container specific configuration.

Embodiment may identify applications which should be included or excluded from the container based on device compliance. For example, factors such as operating systems, operating system versions, the device being password or pin protected, password protection being of a certain level (such as length and/or complexity), etc.

As noted previously, embodiments may allow applications to participate in multiple distinct containers.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 2:
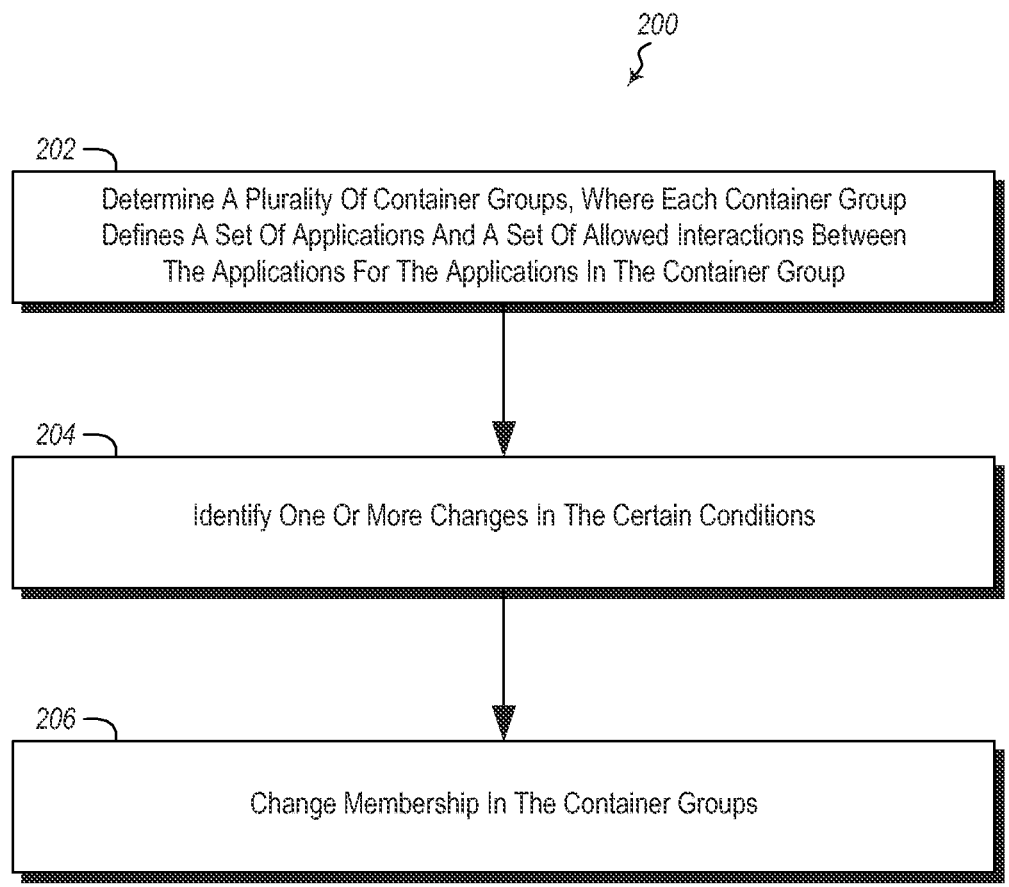
FIG. 2 illustrates a method of managing application interaction on a device using dynamic containers.

Referring now to FIG. 2, a method 200 is illustrated. The method 200 includes acts that may be practiced in a computing environment. The method 200 includes acts for managing application interaction on a device. The method 200 includes, for a set of applications on a device, based on certain conditions, determining a plurality of container groups (act 202). Each container group defines a set of applications and a set of interaction parameters defining boundaries of interaction between the applications for the applications in a given container group. Thus, for example, as illustrated in FIG. 1, applications 104 may be organized into different containers 118. Applications within a given container are allowed, to interact with each other in certain ways as defined by the parameters for a given container. Interaction details will be discussed in more detail below.

The method 200 further includes identifying one or more changes in the certain conditions (act 204). Examples of various changes are illustrated below.

The method 200 further includes, as a result of identifying one or more changes in the certain conditions, changing membership in the container groups (act 206). Thus, applications can be dynamically placed in different containers.

Various interaction boundaries may be enforced for applications in the same container. For example, the method 200 may be practiced where the boundaries of interactions between the applications comprise allowing sharing encryption for a dataset. Thus for example, different applications can use a same encrypted dataset. The applications may share encryption and decryption keys when they are in the same container.

Alternatively or additionally, the boundaries of interactions between the applications may include restricting access to certain data.

Alternatively or additionally, the boundaries of interactions between the applications may include restricting certain interactions. For example, cut/copy/paste functionality may be restricted between applications in the same container and/or from those applications to other applications. Other boundaries may include boundaries on starting another application, checking for the existence of another application, reading documents or data from another application, sending data to another application, being started by another application, etc.

The method of claim may be practiced where the certain conditions comprise factors related to installation source for an application. For example, container selection for an application may be different when the application is installed from a general application store than when installed from an organization specific repository of applications.

The method 200 may be practiced where the change in certain conditions includes factors related to installation of an application. For example, a new application being installed may affect container decisions for other applications. This may be due to the installed application itself being included in one or more containers, restrictions of existing applications with respect to the installed application, or for other reasons. Similarly, the method 200 may be practiced where the change in certain conditions includes factors related to removal of an application. Similarly, the method 200 may be practiced where the change in certain conditions includes factors related to an application update.

The method 200 may be practiced where the change in certain conditions includes factors related to change in policy. Policy changes may affect how applications are assigned to containers.

The method 200 may be practiced where the change in certain conditions includes factors related to an application action.

The method 200 may be practiced where the change in certain conditions includes factors related to identity switching. Thus, for example, if a user switches accounts or otherwise switches their identity on a device, this may cause a change in how applications are assigned to containers.

The method 200 may be practiced where the change in certain conditions includes factors related to geo-fencing. Thus, for example, the physical location of the device may be determined (such as through GPS, cellular tower tracking, location services, etc.) and the physical location my be used to determine how applications are assigned to containers. Similarly, the method 200 may be practiced where the change in certain conditions includes factors related to time fencing. Container assignments may be changed based on time. Thus, for example, at certain times of the day, administrators may wish to restrict or permit application functionality. For example, an administrator may wish to allow access to certain data during working hours, but restrict the access outside of those hours.

The method 200 may be practiced where the change in certain conditions includes factors related to network changes. Thus, for example, certain network may be more secure than other networks. Alternatively or additionally, a VPN may be used which will affect container assignments. Alternatively or additionally, decisions may be based on the type of network (such as wireless, cellular, hardwired), speed of the network, or other considerations. Applications may be placed into containers, based on network considerations and/or changing network considerations, to allow or restrict data access.

The method 200 may be practiced where the change in certain conditions includes factors related to change in device compliance state. For example, a device may have its data encryption, password, or other state changed to a non-compliant state.

The method 200 may be practiced where an application can belong to a plurality of different containers.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include: Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, a method of managing application interaction on a device using dynamic containers, the method comprising:
   determining a plurality of container groups, wherein each container group defines a set of applications and a set of interactions parameters defining boundaries of interactions between the applications for the applications in the container group;
   for each application of a set of new applications installed on a device, determining which one or more container groups in the plurality of container groups each application of the set of new applications should be granted access to, based on certain conditions, the granted access to the one or more container groups defining membership of the container groups, wherein the newly installed applications are not a part of the device operating system, and wherein the determining includes determining the installation source of at least one application in the set of new applications, wherein when it is determined that the at least one application is being installed from a first source, the at least one application is not granted access to any container group of the plurality of container groups, but wherein when it is determined that the at least one application is being installed from a second source, the at least one application should be granted access to at least one of the one or more container groups;
   identifying one or more changes in the certain conditions; and
   as a result of identifying one or more changes in the certain conditions, changing membership in the container groups by at least changing granted access of one or more application to the one or more container groups.

2. The method of claim 1, wherein the boundaries of interactions between the applications comprise allowing sharing encryption for a dataset.

3. The method of claim 1, wherein the boundaries of interactions between the applications comprise restricting access to certain data.

4. The method of claim 1, wherein the boundaries of interactions between the applications comprise restricting certain interactions.

5. The method of claim 1, wherein the certain conditions comprise factors related to installation source for an application.

6. The method of claim 1, wherein the change in certain conditions comprise factors related to one or more of: installation of an application; removal of an application; change in policy; an application update; an application action; identity switching; geo-fencing; time fencing; network changes; or change in device compliance state.

7. The method of claim 1, wherein an application can belong to a plurality of different containers.

8. The method of claim 1, wherein changing membership in the container groups includes at least granting access for the at least one application to the one or more container groups.

9. A device comprising:
   one or more processors; and
   a hardware storage device including stored computer executable instructions that are executable by the one or more processors to cause the device to implement a method for managing application interaction on the device, the method comprising:
      a plurality of installed applications, the applications having been installed separately from the operating system;
      a plurality of application containers, wherein a given application container groups applications together and enforces boundaries of interaction between the applications in the given container;
      for each application of the plurality of installed applications, determining which one or more application containers in the plurality of application containers each application should be granted access to, based on certain conditions, the granted access to the one or more application containers defining membership of the application containers, wherein the determining includes determining the installation source of at least one application in the set of new applications, wherein when it is determined that the at least one application is being installed from a first source, the at least one application is not granted access to any container group of the plurality of container groups, but wherein when it is determined that the at least one application is being installed from a second source, the at least one application should be granted access to at least one of the one or more container groups; and
      wherein the device is configured to change a set of applications in a container based on changes in conditions by at least changing granted access of one or more installed applications to the one or more application containers.

10. The device of claim 9, wherein the boundaries of interactions between the applications comprise allowing sharing encryption for a dataset.

11. The device of claim 9, wherein the boundaries of interactions between the applications comprise restricting access to certain data.

12. The device of claim 9, wherein the boundaries of interactions between the applications comprise restricting certain interactions.

13. The device of claim 9, wherein the device is configured to change a set of applications in a container based on changes in factors related to installation source for an application.

14. The device of claim 9, wherein the device is configured to change a set of applications in a container based on changes in factors related to one or more of: installation of an application; removal of an application; change in policy; an application update; an application action; identity switching; geo-fencing; time fencing; network changes; or change in device compliance state.

15. The device of claim 9, wherein the device is configured to allow an application to belong to a plurality of different containers.

16. The device of claim 9, wherein the executable instructions configured to execute a method further include changing membership in the container groups by at least granting access for the at least one application to the one or more container groups.

17. One or more computer-readable storage media, wherein the one or more computer-readable storage media comprise computer-executable instructions that when executed by at least one or more processors cause the following to be performed:

determining a plurality of container groups, wherein each container group defines a set of applications and a set of interactions parameters defining boundaries of interactions between the applications for the applications in said each container group;

for each application of a set of new applications installed on a device, determining which one or more container groups in the plurality of container groups each application should be granted access to, based on certain conditions, the granted access to the one or more container groups defining membership of the container groups, wherein the newly installed applications are not part of the device operating system, and wherein the determining includes determining the installation source of at least one application in the set of new applications, wherein when it is determined that the at least one application is being installed from a first source, the at least one application is not granted access to any container group of the plurality of container groups, but wherein when it is determined that the at least one application is being installed from a second source, the at least one application should be granted access to at least one of the one or more container groups;

identifying one or more changes in the certain conditions; and as a result of identifying one or more changes in the certain conditions changing membership in the container groups by at least changing granted access of one or more application to the one or more container groups.

18. The one or more computer readable storage media of claim 17, wherein the boundaries of interactions between the applications comprise allowing sharing encryption for a dataset.

19. The one or more computer readable storage media of claim 17, wherein the boundaries of interactions between the applications comprise restricting access to certain data.

20. The one or more computer readable storage media of claim 17, wherein the boundaries of interactions between the applications comprise restricting certain interactions.

21. The one or more computer readable storage media of claim 17, wherein the certain conditions comprise factors related to installation source for an application.

22. The one or more computer readable storage media of claim 17, wherein the change in certain conditions comprise factors related to one or more of: installation of an application; removal of an application; change in policy; an application update; an application action; identity switching; geo-fencing; time fencing; network changes; or change in device compliance state.

23. The computer-readable storage media of claim 17 including instructions that when executed by at least the one or more processors further causes the changing to membership to include at least granting access for the at least one application to the one or more container groups.

* * * * *